United States Patent [19]

Erlenmaier

[11] Patent Number: 4,951,375
[45] Date of Patent: Aug. 28, 1990

[54] PUNCH PRESS UTILIZING WORKPIECE GUIDANCE SYSTEM TO EFFECT TOOL CHANGING

[75] Inventor: Werner Erlenmaier, Gerlingen, Fed. Rep. of Germany

[73] Assignee: Trumpf GmbH & Co., Ditzingen, Fed. Rep. of Germany

[21] Appl. No.: 356,004

[22] Filed: May 23, 1989

[30] Foreign Application Priority Data

May 27, 1988 [DE] Fed. Rep. of Germany ....... 3818001

[51] Int. Cl.$^5$ .............................................. B23Q 3/155
[52] U.S. Cl. ......................................... 29/568; 72/444; 83/563
[58] Field of Search ..................... 29/568; 72/442, 444; 83/563, 564

[56] References Cited

U.S. PATENT DOCUMENTS

| | | | |
|---|---|---|---|
| 3,678,562 | 7/1972 | Leibinger | 29/568 |
| 3,816,904 | 6/1974 | Herb | 29/568 |
| 4,103,414 | 8/1978 | Herb et al. | 29/568 |
| 4,168,644 | 9/1979 | Leibingel et al. | 83/573 |
| 4,274,801 | 6/1981 | Herb et al. | 414/751 |
| 4,587,716 | 5/1986 | Bytow | 29/568 |
| 4,719,691 | 1/1988 | Klingel | 29/568 |

FOREIGN PATENT DOCUMENTS 2161733  1/1986  United Kingdom ................. 83/563

*Primary Examiner*—Steven C. Bishop

[57] ABSTRACT

A punching machine having a workpiece guidance system and a numeric control therefor, has one or more tool holders mounted upon the transverse rail of the guidance system, and a tool mounting assembly for receiving the punch and the die from the tool holder and securing them into position for punching of sheet metal and like workpieces. The workpiece guidance system effects the motion of the tool holder forwardly to bring the tools into the tool mounting positions, and the tools are then clamped in position. The guidance system is then moved rearwardly with the empty tool holder to a position where the punching operation can be conducted. Generally, the work table and the workpiece are moved forwardly with the workpiece guidance system during the tool changing operation, and a channel is provided in the lower portion of the frame and its worktable to permit movement of the tool holder and the die below the plane of the upper surface of the worktable. Multiple tool holders may be carried upon the transverse rail of the guidance system, or a single tool holder may be mounted at the end of the transverse rail and cooperate with adjacent tool storage devices to effect automatic exchange of tool holders and associated tool sets.

16 Claims, 6 Drawing Sheets

PUNCH PRESS UTILIZING WORKPIECE GUIDANCE SYSTEM TO EFFECT TOOL CHANGING

BACKGROUND OF THE INVENTION

The present invention relates to punching machines using a punching tool set which consists of at least one punch and one die which can be readily changed by machine controlled movement of a holder containing them.

There are various versions of such punching machines which use tool holders providing interchangeable tool sets, but they are rather expensive. Processing a piece normally made of sheet metal in a modern plant requires the use of many punching tool sets for many applications, one after another. As soon as one punching tool set has finished its action, it is exchanged for another, and then a third, etc. When the workpiece has been fully processed, the operator starts punching the next workpiece, again with the first punching tool set.

To make it possible to change punching tool sets quickly, each one is conveniently placed in a tool holder. Each punching tool set consists of at least one punch and one die corresponding to the cross section of the punch. Many times there is also included a stripper. The tool holders are constructed so that the complete punching tool set can be inserted in the tool storage assembly of the punching machine. From this position, they are automatically moved to the mounting position for the individual punching tool parts and locked in place for use. After punching with a tool set is finished, it and its holder are taken out of the tool feeder after the locking devices holding the tools in operative position are unlocked. This set is moved to a position where it does not interfere with the punching, but where it can still be reached again quickly and safely.

As will be appreciated, it would be relatively time consuming and thereby expensive to take the tools out of the holder and to replace them with a new set of tools. For this reason, each tool set is kept with its own holder on a shelf or in a storage device. The holder can be given a grip for manual changing; however, to do this, one must reach into the machine work area and this is not permitted around running machines for technical and safety reasons. Each manual tool change thus requires shutting down the punching machine.

It is also known how to transport the holder from a main storage area by means of a tool changing device to the punching tool feeder and from there back to the place of storage. In this case, it is especially advantageous if the changing device automatically exchanges the finished tool set and its holder. Generally, such machines utilize a comparatively expensive and space-intensive design. Moreover, they require a special control, which, especially with automatic punching machines, must be coordinated with their work program. Therefore, it is not unusual for the cost of the automatic tool changing feature alone to amount to one-fourth to one-third of the total cost of the punching machine.

It is an object of the present invention to provide a novel punching machine in which tool feeding to, and removal from, the tool mounting assembly is effected by the workpiece guidance system.

It is also an object to provide such a machine in which the tool sets carried by the workpiece guidance system may be readily exchanged.

Another object is to provide such a machine in which the tool sets on the guidance system may be exchanged with tool sets in an auxiliary storage area by automatic action of the machine.

A further object is to provide such an automatic tool changing punching machine which is relatively low cost but which is reliable in operation.

SUMMARY OF THE INVENTION

It has now been found that the foregoing and related objects and advantages may be readily attained in a punching press which has a frame with a base and a head spaced thereabove. As is conventional, a ram is reciprocatably mounted in the head for movement relative to the base, and it defines a workstation. Tool mounting means is provided in the head and base at the workstation for releasably mounting a cooperating punch and die.

A workpiece guidance system includes a transversely extending elongated rail and is supported on the frame for clamping an associated workpiece and effecting its movement relative to the workstation in horizontal, perpendicularly oriented X and Y axes. Supported on the rail for movement therewith is at least one tool holder projecting forwardly therefrom, and it has tool seating portions at the forward end thereof. The machine includes means for moving the rail with the tool holder thereon to cause the tool holder to abut the tool mounting means in the head and transfer the punch between the holder and the tool mounting means.

Desirably, the tool holder is removably supported on the rail so that tool holders may be readily exchanged. Generally, an intermediate support member is mounted on the elongated rail and the tool holder is releasably mounted in the intermediate support member. In one embodiment, the intermediate support member has a carrier portion extending parallel to the rail and several tool holders are mounted thereon in laterally spaced relationship. The intermediate support member may be movable along the rail and it can be locked in a fixed position thereon. Preferably, the tool holder and intermediate support member have cooperating engagement means to enable the holder to be mounted in the support member by movement in a vertical direction. This engagement means may comprise a vertical slot in the support member with a transverse shoulder at the bottom end thereof and a tongue on the holder which is slidable in the slot.

Normally, the machine includes a computer control which controls movement of the guidance system and which is adapted to move the rail to bring the tool holder into alignment with the workstation and then to move the tool holder forwardly to the workstation. There is also included means for releasably locking the tool holder in a fixed position along the rail, and the computer control may be adapted to release the locking means to effect movement of the tool holder to another position along the rail.

In one embodiment, a multiplicity of tool holders may be mounted on the rail in spaced positions. In another embodiment, the tool holder is disposed adjacent one end of the transverse rail, and there are included a movable arm on the rail removably seating the holder thereon, and means for moving the arm relative to the rail. This arm may be pivotable about a vertical axis perpendicular to the longitudinal axis of the rail, and the moving means may be a hydraulic or pneumatic cylinder to effect the movement.

Preferably, there is included a tool holder storage member for several tool holders, and the support member movable arm can be moved into alignment with, and releasably engaged with, holders in the tool holder storage member to effect exchange of tool holders. The tool holder storage member may have the tool holders disposed about an arc, and be pivotable about a vertical axis. The computer control effects rotation of the storage device to align an empty storage position for a holder, or the desired tool holder, with the movable arm.

DETAILED DESCRIPTION OF THE ILLUSTRATED EMBODIMENTS

Figure 1:
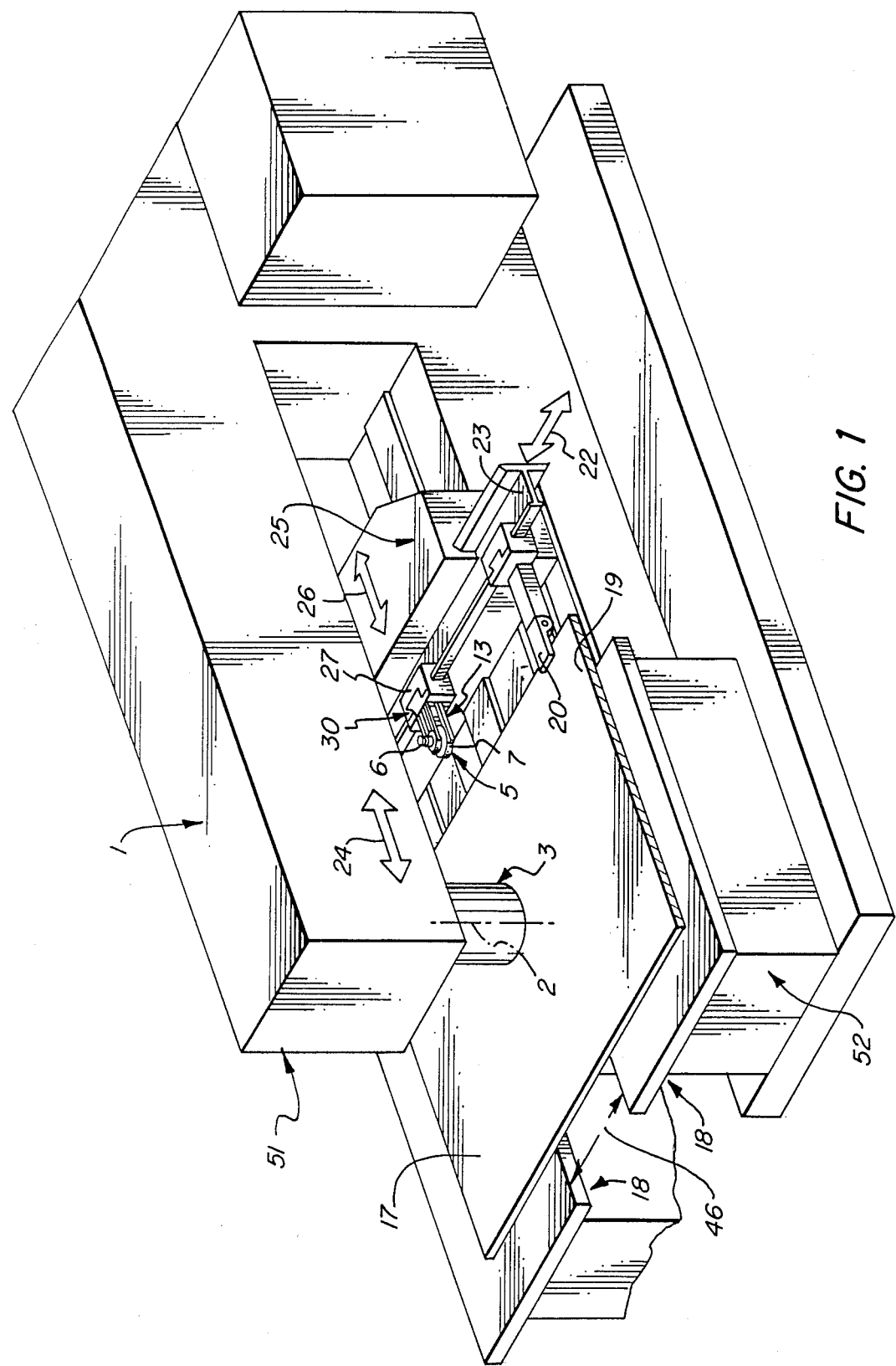
FIG. 1 is a fragmentary perspective view of a punching machine embodying the present invention, and with a workpiece disposed thereon.

Turning first to FIG. 1 of the attached drawings, therein illustrated fragmentarily is a punch press embodying the present invention and having a frame generally designated by the numeral 1. The forwardly extending head or arm 51 is disposed over a bifurcated base 52 upon which are a pair of laterally spaced workpiece support tables 18 for supporting the workpiece 17. To effect motion of the workpiece 17 relative to the punching station, the machine has a workpiece clamping and guidance system generally designated by the numeral 25 which includes the transverse rail or carrier track 23 which carries clamps 20 for engaging the workpiece 17. The guidance system 25 may be moved forwardly and rearwardly as shown by the double headed arrow 26, and the carrier track 23 may be moved perpendicularly thereto as seen by the double headed arrow 22.

Figure 2:
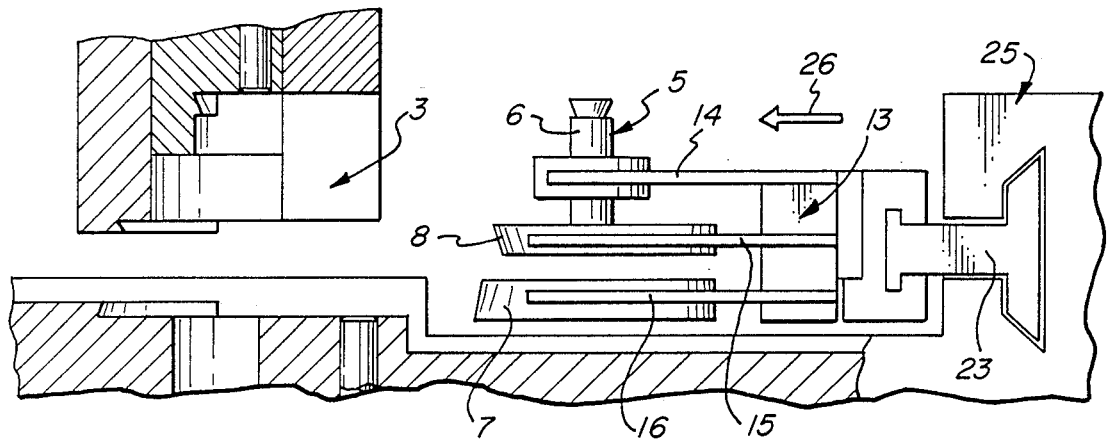
FIG. 2 is a fragmentary sectional view, drawn to an enlarged scale, of the tool mounting assembly area of the punching ram and machine base with the workpiece removed and showing a tool holder supported on the workpiece guidance system transverse rail and being moved toward the tool mounting assembly.

As is well known in this type of press and as seen in FIG. 2, a ram 50 in the head 51 of the punching machine includes the upper portion 2 of the tool mounting assembly generally designated by the numeral 3 and is configured to receive and firmly seat the punch 6. A tool holder or cassette generally designated by the numeral 13 is seated in the intermediate support member 27 carried by the transverse rail 23 of the workpiece guidance system 25. As is conventional with such cassette-type tool storage elements, the several tools comprising the punch tooling generally designated by the numeral 5, and these tools include the punch 6, the die 7 and the stripper 8. As is also conventional, the punch 6 and stripper 8 are normally seated in the upper portion 2 of the tool mounting assembly 3 while the die 7 is inserted into a die receiving cavity in the base 52 comprising the lower portion 4 of the tool mounting assembly 3.

Figure 3:
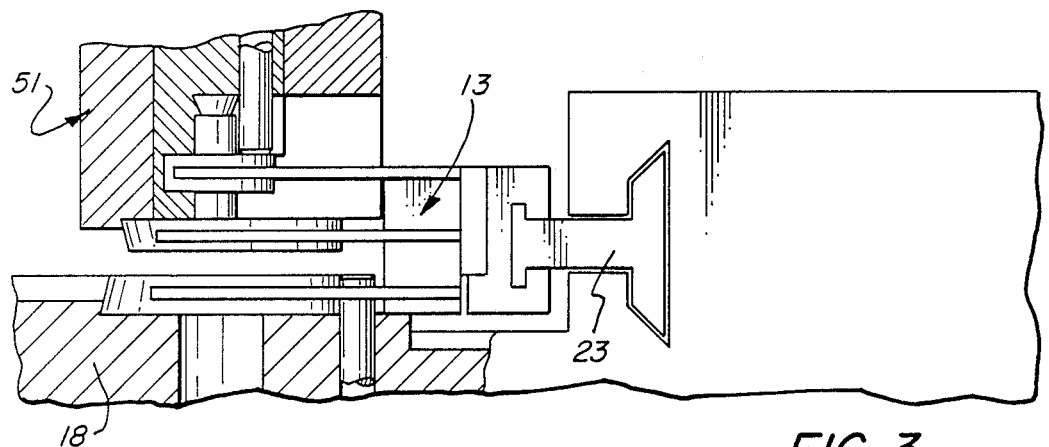
FIG. 3 is a view similar to FIG. 2 with the guidance system moved forwardly to bring the tools on the tool holder into the tool mounting assembly.
Figure 4:
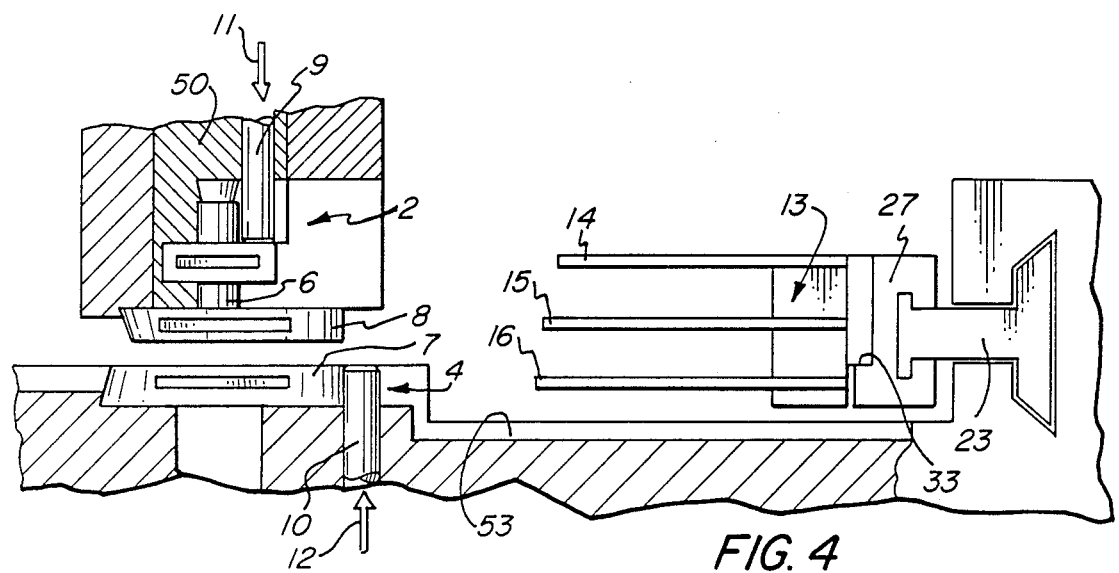
FIG. 4 is a similar view with the tool locking mechanism engaged, and with the tool holder and guidance system moved rearwardly.

As indicated diagrammatically in FIGS. 2-4, the workpiece guidance system 25 is moved forwardly in the direction indicated by the arrow 26 towards the recesses in the tool mounting assembly 3 until the punch 6 and stripper 8 seat in the recess in the upper portion 2, and the die 7 seats in the recess in the lower portion 4. At that point, the locking devices 9 and 10 are moved downwardly and upwardly respectively as indicated by the arrows 11 and 12 to engage and retain the punch 6 and die 7 in the tool mounting assembly 3. The guidance system 25 is now moved rearwardly to disengage the several tools from the retaining arms 14, 15 and 16 of the tool holder 13.

To effect removal of a set of tools 5 from the tool mounting assembly 3, an empty tool holder or cassette 13 is moved into the position shown in FIG. 3 so that its arms 14, 15 and 16 engage the several tools, and the locking devices 9 and 10 are retracted so that the tools are clamped between the arms 14, 15 and 16 and withdrawn from the tool receiving recesses of the tool mounting assembly 3.

Figure 5:
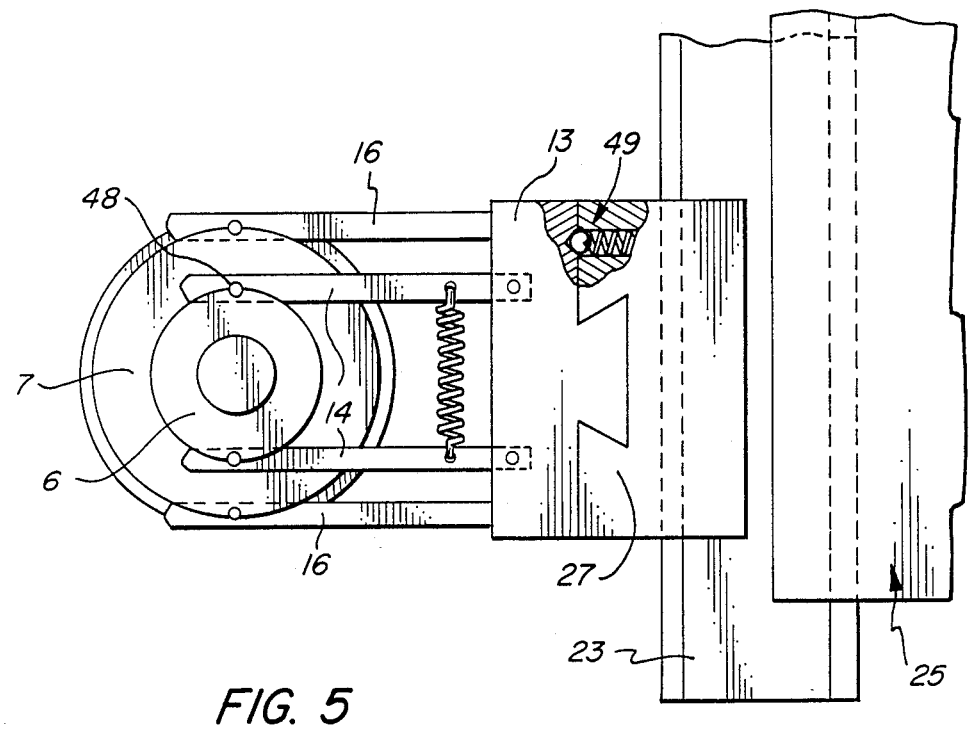
FIG. 5 is a fragmentary plan view of the tool holder assembly seen in FIG. 2.

As seen in FIG. 5, each pair of arms 14, 15 and 16 is biased together by springs 47 (only one of which is shown) to grip the appropriate tools therebetween. The arms are pivotable in the base portion of the holder 13 and they have at their outer ends aligning or centering pins 48 which will seat in cooperating grooves or recesses in the periphery of the punch 6, die 7 and stripper 8 (not shown) to ensure precise positioning therewithin. When the set of tools 5 is locked into the tool mounting assembly 3, and the guidance system 25 is moved rearwardly, the motion will cam the arms 14, 15 and 16 apart against the biasing pressure of the springs 47 to release the tools from the arms. Similarly, when the empty holder 13 is moved against tools which are mounted within the tool mounting assembly 3, the cam surfaces at the ends of the arms 14, 15 and 16 will cam them apart to allow the tools to be received therebetween until the centering pins 48 seat in the grooves in their periphery.

As seen in FIGS. 1-5, the intermediate support member 27 has a vertically extending slot therein which terminates above its lower end to provide a transverse bottom wall, and the tool holder cassette 13 has a tongue which seats in that slot. The cross section of the slot and of the tongue may be referred to as butterfly-shaped. It will be appreciated that the tool holder 13 may be removed from the intermediate support member 27 by lifting it vertically outwardly from the slot in which it is seated. As seen in FIG. 5, to ensure proper vertical spacing of the tool holder 13 within the intermediate support element 27, a spring-loaded ball and detent 49 are provided.

To facilitate sliding motion of the workpiece 17 thereon, the top surface of the worktables 18 desirably is provided with rotatable ball elements spaced thereabout (not shown). The workpiece guidance 25 system requires clamps 20 on the transverse rail 23 to grip the workpiece 17 firmly, and these clamps 20 may be opened and closed automatically under action of the numeric control system 21 by pneumatic or hydraulic cylinders (not shown) as is well known to those skilled in the art. By so doing, the workpiece 17 may be gripped, released and repositioned within the guidance system 25 for movement on the worktables 18 when so desired.

As previously indicated and as seen in FIG. 1, the workpiece guidance system 25 can move forwardly and rearwardly as shown by the double arrow 26 and from side-to-side as shown by the double arrow 22. This effects the desired motion of the workpiece 17 relative to the workstation at the ram 50. Movement forwardly and rearwardly shown by the double arrow 26 is generally considered to be movement in the X axis, and the movement from side-to-side in the direction shown by the double arrow 22 is considered to be movement in the Y axis.

As is well known to those skilled in the art, the workpiece guidance system 25 will include gears and racks (not shown) to enable precise motion in both of the axes in response to instructions received from the numerical control system 21 (seen in FIG. 7) for the machine. Typically the transverse rail 23 will have a toothed rack (not shown) along its rear surface which is engaged with a driven gear (not shown), and the base 52 of the frame 1 will have a rack (not shown) extending perpendicularly thereto which is engaged with a gear (not shown) in the main portion of the guidance system 25 to effect motion of the entire assembly in the direction of the double arrow 26.

In the embodiment of FIG. 1, a single intermediate support member 27 providing a single groove for receiving a cassette 13 has been illustrated. The intermediate support member 27 is clamped upon the transverse rail 23 by a hydraulic or pneumatic cylinder (not shown) in the same fashion as is customary for the clamps 20. By releasing the clamping action, the support member 27 may be moved along the length of the transverse rail 23 to position it in alignment with the tool mounting assembly 3 for purposes of effecting the transfer of tooling to and from it. This movement along the length of the transverse rail 23 may be effected automatically by releasing the clamping action and utilizing one of the clamps 20 to push the intermediate support member 27 into the desired position along the length of the rail 23 after which the numeric control 21 may effect clamping in that position.

Figure 6:
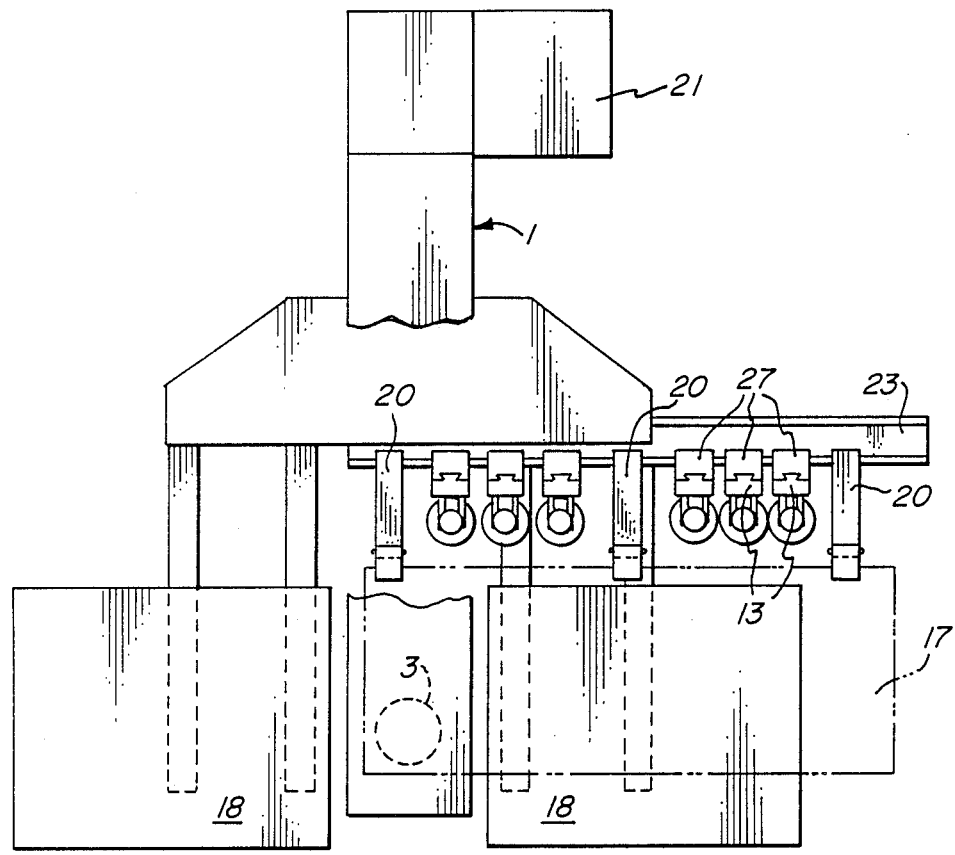
FIG. 6 is a plan view of the punch press of FIG. 1 but showing a multiplicity of tool holders mounted upon the transverse rail of the workpiece guidance system, and with a portion of the punching head broken away for purposes of illustration, and showing the workpiece in phantom line engaged by the clamps of the workpiece guidance system.

In the embodiment of FIG. 6, it can be seen that there are three clamps 20 spaced along the length of the transverse rail 23, and between pairs of clamps 20 are disposed two groups of three similarly constructed intermediate support elements 27 each containing a tool holder cassette 13. Thus, this embodiment provides six sets of tooling for use in the machine, each of which may be exchanged in the same fashion as described for the embodiment of FIG. 1. To provide still more tools, cassettes 13 may be removed from the support members 27 and other cassettes 13 placed therein. Removal is effected by moving the cassettes 13 upwardly and overcoming the biasing pressure of the ball detent 49.

Figure 7:
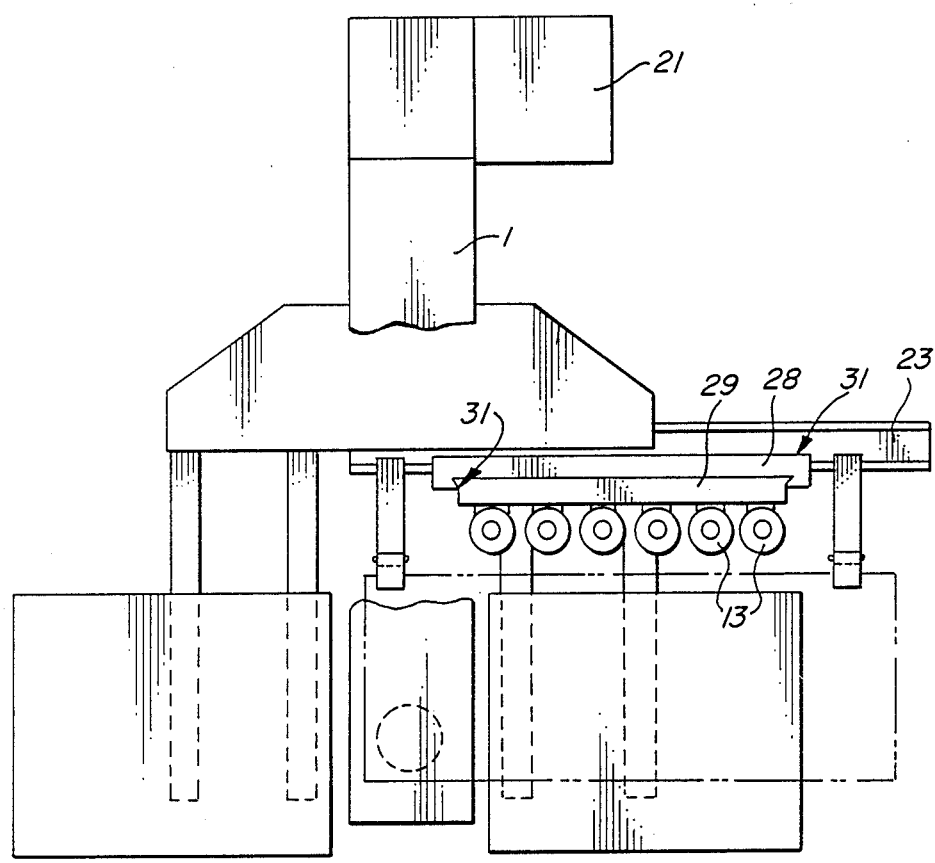
FIG. 7 is a similar view of the punching machine employing another embodiment of the tool holder transfer system of the present invention.

In the embodiment of FIG. 7, a series of tool holding cassettes 13 are mounted upon an elongated common carrier member 29 which seats in the elongated intermediate support member 28 to provide the tool carrying assembly generally designated by the numeral 31. The entire tool holding subassembly comprised of the tool holders 13 and common carrier member 29 may be removed and inserted into the intermediate support member 28 in the same fashion as individual units with respect to the prior embodiment. If so desired, the individual cassettes 13 may be removably mounted in the common carrier beam 29. Thus, in this particular embodiment, it can be seen that a group of cassettes 13 may be readily removed and substituted in the intermediate support member 27. As in the instance of the prior embodiment, the connection can be the butterfly groove and tongue arrangement.

As will be appreciated, the use of the intermediate support members 27 which are mounted on the transverse rail 23 enables the mounting of the tool holders or cassettes 13 therewithin so that they may be readily removed without having to remove the clamps 20. In the embodiment of FIG. 7 an entire group of tool holders 13 may be removed quickly to expedite the process. Obviously, shorter common carrier members 29 and intermediate support elements 28 may be provided when lesser numbers of tool holders 13 are to be mounted as units. Thus, smaller groups of tool holders 13 may be removed at one time on a common carrier member 27.

To enable the tool holder 13 in the present apparatus to exchange both punch 6 and die 7 from the tool holding assembly 3, the base 52 provides channel 53 aligned with the punching station and perpendicular to the longitudinal axis of the transverse rail 23. As a result, the lower portion of the cassette 13 may travel in this channel 53 to enable insertion of the die 7 into the lower portion 4 of the tool mounting assembly 3 as seen in FIGS. 2–4.

In the illustrated embodiment, the work support table is comprised of two separate elements 18, with a spacing 46 therebetween, and these may be movably supported on the base 52. Alternatively, the worktable 18 may be formed as one piece.

As will be readily appreciated, the intermediate support members 27 and the associated cassettes 13 are precisely positioned along the length of the transverse rail 23 so that the numerical control 21 can effect motion of the workpiece guidance system 25 to align the desired cassette 13 with the tool mounting assembly 3 by motion along the X axis. At such time as this alignment has been effected, the numeric control 21 can then advance the guidance system 25 to bring the tools 5 in the holder 13 into the appropriate portions of the tool mounting assembly 3.

As seen in FIG. 5, each pair of arms 14, 15 and 16 are biased together by springs 47 (only one of which is shown) to grip the appropriate tools therebetween. The arms themselves are pivotable in the base portion of the holder 13 and they have at their outer ends aligning pins 48 which will seat in cooperating grooves or recesses in the periphery of the punch 6, die 7 and stripper (not shown) to ensure precise positioning therewithin. When the tools are locked into the tool mounting assembly, and the guidance system is moved rearwardly, the motion will cam the arms 14, 15 and 16 apart against the biasing pressure of the spring 47 to release the tools from the arms. Similarly, when the empty holder 13 is moved against tools which are mounted within the tool mounting assembly 3, the cam surfaces at the ends of the arms will cam them apart to allow the tools to be received therebetween until the centering pins seat in the grooves in their periphery.

To ensure proper vertical spacing of the tool holder within the intermediate support element 27, a spring loaded ball and detent assembly 49 is provided.

Figure 8:
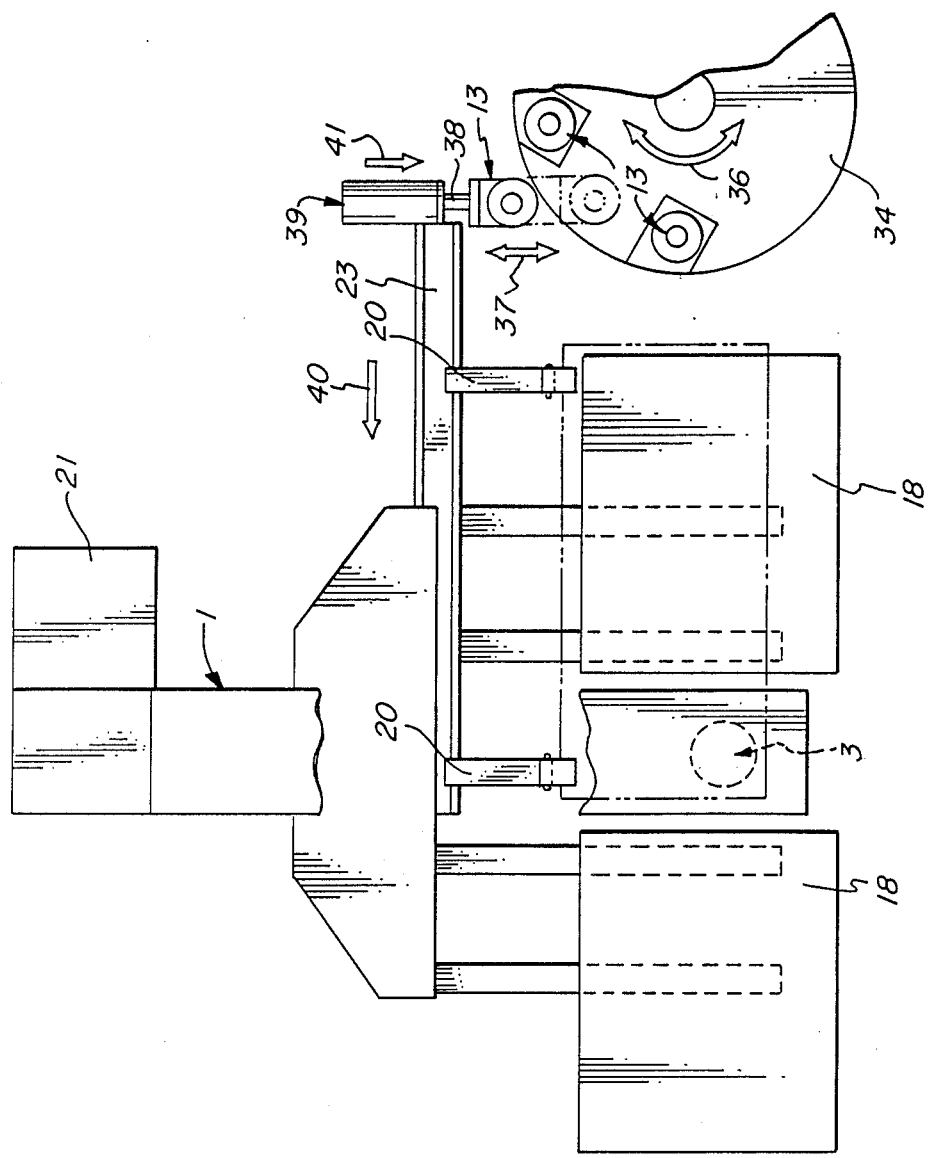
FIG. 8 is a similar view of the machine with still another embodiment of tool holder transfer system of the present invention.
Figure 9:
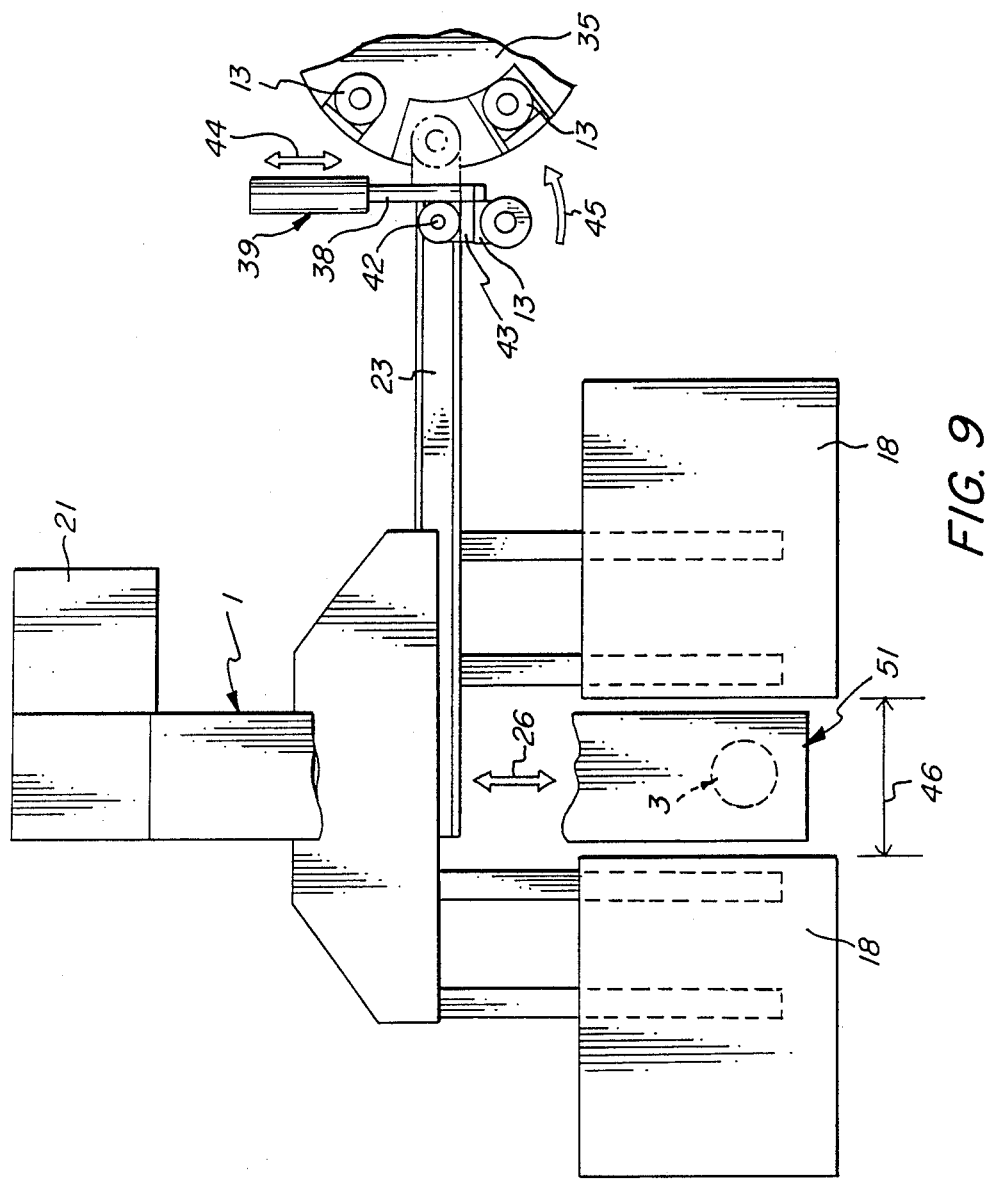
FIG. 9 is a similar view of the machine embodiment of FIG. 8 with a different embodiment of tool holder transfer mechanism.

Turning now to FIGS. 8 and 9, a single tool holder 13 is used in these embodiments and it is located adjacent the edge 19 of the transverse rail 23 outwardly of any of the clamps 20 so that it may cooperate with tool holder storage devices illustrated therein. Fragmentarily illustrated in both FIGS. 8 and 9 is a tool holder storage device designated by the numerals 34 and 35 respectively, and it has recesses about its circular periphery in which are received tool holders or cassettes 13. The storage device 34 or 35 may be rotated about a central axis in order to bring different tool holders 13 stored within it into operative alignment with the holder retaining mechanism at the end of the rail 23. The rotational position of the tool holder storage device or carousel 34,35 may be altered by the numerical control system 21 in accordance with the program stored therein operating a rotational drive therefor (not shown). The device 34,35 may be rotated in either direction as seen by the double headed arrow 36 to locate an empty storage position or a desired holder 13 in the operative position.

Turning first in detail to FIG. 8, the transverse rail 23 carries a tool holder mounting mechanism including a hydraulic cylinder 39 and piston 38 which has its end releasably engageable with a tool holder or cassette 13. As a result, the transverse rail 23 may be moved to the right where it is aligned with a peripheral portion of the storage device 34, and the piston 38 actuated to move the tool holder 13 outwardly into a vacant storage position about the circumference of the storage device 34. A hydraulic lock or clamp (not shown) on the end of the piston 38 is released to leave the tool holder 13 seated in its storage position in the device 34. The storage device 34 can then be rotated to bring the desired tool set 5 into alignment with the cylinder assembly, and the piston 38 again moved outwardly to engage the desired tool cassette 13 and remove it from the storage device 34. Then it can be moved by the transverse rail 23 in the direction indicated by the arrow 40 to a point where it is aligned with the tool mounting assembly 3, at which point it can be moved forwardly to place its tools in the tool mounting assembly 3. The workpiece guidance system 25 may be moved forwardly to a point where the hydraulic cylinder 39 may be actuated to move the piston 38 outwardly and thereby move the tools in the cassette 13 into the mounting positions within the tool mounting assembly 3.

Turning now to FIG. 9, the intermediate member for mounting the tool holder 13 comprises an arm 43 which is pivoted upon the transverse rail 23 for pivotal motion about the axis 42 as indicated by the arrow 45. In this instance, the piston 38 of the cylinder 39 is attached to the arm 43 at a point outwardly from the pivotal axis 42. When the piston is retracted as indicated by the arrow 44, the arm 43 will be pivoted about the axis 42 from its position shown in full line to a point 90° therefrom as shown in phantom line. In this position, it will move into one of the storage recesses about the periphery of the storage device 35. After seating of the cassette 13 in the storage device 35 and its release from the piston 38, the cylinder 39 is actuated and the piston 38 is again extended to pivot the arm 43 in the reverse direction, and the storage device 35 may be rotated to bring the next desired tool set into the operative position. At this point, the cylinder 38 is again actuated to rotate the arm 43 and thereby engage the desired cassette 13 which may be extracted from the storage device 35.

In operation of the embodiment of FIG. 1 with its single tool holder, the operator must change the tool holders in order to effect change in the tool sets available for use. Thus, the guidance system 25 is moved forwardly with the empty tool holder 13. As it moves forwardly, it also moves the workpiece 17, and the work support table 18 forwardly until such time as the tool holder 13 comes into registry with the tool mounting mechanism 3 to engage the mounted tooling.

The workpiece guidance system 25 is then moved rearwardly and simultaneously the workpiece 17 and the work support table 18 are moved rearwardly. The operator then exchanges the tool holder 13 in the intermediate support member 27 so that the new tool holder 13 may be moved forwardly to place its tool set 5 in the tool mounting assembly 3.

In the embodiment of FIG. 6, the numeric control system 21 is programmed with the information concerning the various tool sets 5, and when those tool sets should be used during the punching operation. The computer 21 is aware of the positioning of the tool holders 13 along the rail 23. As one tool set 5 has finished its punching action, the guidance system 25 is moved forwardly with the empty tool holder 13 aligned with the tool mounting assembly 3 so as to engage and remove the tooling therefrom. The transverse rail 23 may then be moved laterally to orient the tool holder 13 containing the next set 5 of punch tooling in alignment with the tool mounting assembly 3, and the guidance system 25 moved forwardly to place its tooling in the tool mounting assembly 3. This process is repeated until the operations on a particular workpiece 17 have been completed.

In the embodiment of FIGS. 8 and 9, after the tool set 5 in the tool mounting assembly 3 has completed its operations upon the workpiece, the empty tool holder 13 is moved forwardly to engage and remove that tool set, and then the transverse rail 23 is moved to the side to the position seen in FIG. 8 to bring the used set of tooling into alignment with a storage space in the storage device 34. The piston 38 is moved outwardly in the instance of the embodiment of FIG. 8 to place the tool holder 13 in a empty storage space in the device 34.

In the embodiment of FIG. 9, the piston 38 is retracted to rotate the tool holder 13 about its pivotal axis 42 and the transverse rail 23 is then indexed further to the right as seen in FIG. 9 to place the tool holder 13 in an empty space within the storage device 35. In both embodiments, the storage device 34,35 is rotated to bring the desired tool set for the next operation into operative alignment with the tool holder support member and the procedure is repeated to engage the new tool holder 13 to mount it upon the tool holder support member. At that point, the transverse rail 23 is moved to the left as seen in FIGS. 8 and 9 to bring the tool holder 13 into alignment with the tool mounting assembly 3 for placement of the tooling into the operative position.

The transverse rail of the guidance system in punching machines used today is relative long and generally ranges from 2 to 3 meters, and the transverse rail normally has two holding claws or clamps for the workpiece. The otherwise unused space between or on either side of these two clamps can be used for mounting the tool holders. This means that, given the size of the punching tool sets and the holders which may be used in such a punching machine, about 8 to 12 holders, each with a complete set of punching tools, may be provided on one such rail. However, one must be careful to ensure that the clamps can securely grip the workpiece as usual and that their functioning is not adversely affected by the holders. To ensure that this is the case, the distance which the tool holders project from the rail must be less than the distance to the clamping surfaces of the clamps which lock the workpiece between them.

Although the embodiments of FIGS. 8 and 9 show one holder at one end of the transverse rail, it will be appreciated that a holder may be provided at each end of the rail. To change the tool set in such end mounted tool holders, the tool holder mounting member can be rotated so as to project sideward to make it especially accessible. Then one may exchange the holder for another holder with another tool set, and this can be done automatically or manually.

In the preferred structure for this end mounted location of tool holder, it may be held in a rotating or movable arm which is carried by the transverse rail, and this arm is connected to a rotatable or adjustable machanism to effect its motion. With the movable arm, the holder can be swung sideways and thereby be made more accessible. This swinging or other movement of the holder may also be used to change one holder for another in a storage device located adjacent the end of the transverse rail.

As indicated, the rotating or adjusting mechanism for the tool holder is conveniently a hydraulic or pneumatic cylinder. As a rule, hydraulic oil or air pressure is used with such punching machines so that the power is available for this new function and presents no problems. An offset motion to effect rotation can be replaced by a straight line adjustable motion if this is preferred. Straight-line pushing movement of the holder arm can also be used to effect final movement to transfer the holder into the tool mounting assembly of the machine. This is also true for the swinging movement of the arm relative to the transverse rail, i.e., the swinging arm can also be used to effect mounting and removal of tools from the mounting assembly.

With the tool holder at the end of the transverse rail, it can be seen that the tool holder support mechanism can reach into an adjacent storage device and get the next holder needed from it. If a rotating arm is located near the free end of the carrier track, then the carrier track itself need not move into the storage space, but one can bridge the distance between the end of the carrier track and the storage device with this arm. In this way, one may avoid having a dedicated feed arm.

If so desired, the tool holder support arm may be designed as a double-arm lever with a clamping device for a tool holder on both ends. In this fashion, one end may be used to hold the tool holder with the removed tool set to be inserted into the storage device and the other end to take the next holder containing the tool set which is needed so as to expedite tool changing. To ensure that the double-arm lever is not in the way during operation of the machine and normal movement of the transverse rail, it is desirable to provide for adjustable movement vertically of the rail.

By use of the storage devices in which the holders are arranged along a circular arc, turning movement of the storage device will align individual holders or vacant spaces in the storage device with the tool holder support member. In a straight-line arrangement of the holders in the storage device, the holding rows would be moved into alignment with the stationary tool holder support member and then the holder moved from the storage device to the support member or vice versa. In each case, however, the distance between the support member and the holder "selected" must be bridged. This can easily be done with holders arranged in a straight line which can be pushed in a direction perpendicular to the rail if one moves the rail a little bit further outwardly, i.e., toward the storage device.

Accordingly, one version of tool storage device is characterized by several rows of holders arranged vertically in a unit which can be raised and lowered, so that various rows can be aligned with the tool holder support member. Tool transfer then takes place each time in the previously described ways after the raising or lowering of the row of holders in question, and the alignment of the tool holder support member with the holder having the tool holder chosen from that row.

In the illustrated embodiment, the workpiece support tables are spaced to opposite sides of the channel for the tool holder movement, and the distance between them is slightly greater than the width of a holder, as measured transversely of the transfer direction. On the support table lies the metal workpiece to be punched, and over the workpiece is the tool mounting assembly portion for the punch and below it the portion for the die.

If only one holder is on the transverse rail, with stationary tables at corresponding lateral distances, one can still make tool changes even with workpieces lying on the table but outside the channel for movement of the tool holder. The same is true if a unitary support table with a channel is provided; however, the channel must extend far enough into the table so that the holder with the punching tool set can be moved thereacross to the tool mounting assembly.

If there are several holders with punching tools on the transverse rail, one can only align one tool holder at any given time with the slot, or the space in between the workpiece support tables. To enable the whole width of the table to be used, the workpiece support table (or the separate support table sections) are movable forwardly on the machine frame as the guidance system moves forwardly to a position where the tool holders would abut the work support table. In this fashion, the workpiece is also moved forwardly to clear the path for the tool holder, Thus, the table and the workpiece will never get in the way of tool holders during such guidance system movement.

Instead of a horizontally movable common workpiece support table or sections arranged at some distance from one another, one can also have a workpiece support table composed of horizontally adjacent elements in which the division(s) between them parallels the longitudinal axis of the transverse rail. In this case, the separate table elements can be lowered separately, and automatically, to allow tool holders to move thereover. For example, the clamps may then press down as many table parts as is required for the simultaneous movement of the transverse rail and tool holders. However, such movable table structures are desirable both for a single holder on the carrier track and also for several holders on the track.

As will be appreciated, a numerical control system can be utilized to open and close clamps, move the elements of the guidance system and thereby the workpiece and tool holders, and operate the ram. The tool holders are placed at fixed lateral distances on the transverse rail, these locations are entered in the control system which takes them into account during tool changes, to set up for the next tool change, to align an empty holder opposite the tool feed channel and then the tool holder with the next set in that location.

If so desired, the punching machine may also have other processing functions such as a laser work station, at which the workpiece on the support table can be processed aternatively or additionally. The lateral distance between the punch and laser nozzle can be accounted for in workpiece movement by the computer control.

Thus, it can be seen from the foregoing detailed description and attached drawings that the novel punching machine of the present invention provides for automatic tool changing at relatively low cost by use of the workpiece guidance system as the motive force for the changing mechanism. Multiple tool holders may be positioned along the transverse rail of the guidance system, or a single holder may be positioned at one end thereof and effect transfer of tool sets from an adjacent storage device.

Having thus described the invention, what is claimed is:

1. In a punching press, the combination comprising:
   (a) a frame having a base and a head spaced thereabove with a ram reciprocatably mounted therein for movement relative to the base and defining a work station;
   (b) tool mounting means in said head and base at said workstation for releasably mounting a cooperating punch and die;
   (c) a workpiece guidance system including a transversely extending elongated rail, said system being supported on said frame for clamping an associated workpiece and effecting its movement relative to said work station in horizontal perpendicularly oriented X and Y axes;
   (d) at least one tool holder supported on said rail for movement therewith, said tool holder projecting forwardly therefrom and having tool seating portions at the forward end thereof; and
   (e) means for moving said rail with said tool holder to cause said tool holder to abut the tool mounting means in said head and transfer a punch between said holder and said tool mounting means.

2. The punching machine according to claim 1 wherein said tool holder is removably supported on said rail so that tool holders may be readily exchanged.

3. The punching machine according to claim 1 in which there is included an intermediate support member on said elongated rail and said tool holder is releasably mounted on said intermediate support member.

4. The punching machine according to claim 3 in which said intermediate support member has a carrier portion extending parallel to said rail and several tool holders are mounted thereon in laterally spaced relationship.

5. The punching machine according to claim 3 wherein said intermediate support member is movable along said rail and can be locked in a fixed position thereon.

6. The punching machine according to claim 3 wherein said holder and intermediate support member have cooperating engagement means to enable said holder to be mounted in said support member by movement in a vertical direction.

7. The punching machine according to claim 6 in which said engagement means comprises a vertical slot in said support member with a transverse shoulder at the bottom end thereof and a tongue on said holder slidable in said slot.

8. The punching machine according to claim 1 wherein said machine includes a computer control which controls movement of said guidance system and which is adapted to move said rail to bring said tool holder into alignment with said work station and then to move said tool holder forwardly to said work station.

9. The punching machine according to claim 8 wherein there is included means releasably locking said tool holder in a fixed position along said rail and said computer control is adapted to release said locking means to effect movement of said tool holder to another position along said rail.

10. The punching machine according to claim 8 wherein a multiplicity of tool holders are mounted on said rail.

11. The punching machine according to claim 1 wherein said tool holder is disposed adjacent one end of said transverse rail.

12. The punching machine according to claim 11 wherein there is included a movable arm on said rail removable seating said holder thereon and wherein there is included means for moving said arm relative to said rail.

13. The punching machine according to claim 12 wherein said arm is pivotable about vertical axis perpendicular to the longitudinal axis of said rail and said moving means is a hydraulic or pneumatic cylinder to effect its pivoting about said axis.

14. The punching machine according to claim 12 wherein there is included a tool holder storage member for several tool holders, and wherein the support member movable arm can be moved into alignment with, and releasably engaged with, holders in said tool holder storage member to effect exchange of tool holders.

15. The punching machine according to claim 14 wherein said tool holder storage member has said tool holders disposed about an arc and wherein it is rotatable about a vertical axis.

16. The punching machine according to claim 2 wherein said computer control effects rotation of said storage device to align an empty storage position for a holder, and the desired tool holder, with said movable arm.

* * * * *